May 3, 1966 B. BIGOT ETAL 3,249,421
PROCESS FOR MANUFACTURING COMPLEX GRANULATED FERTILIZERS
Filed Feb. 12, 1963
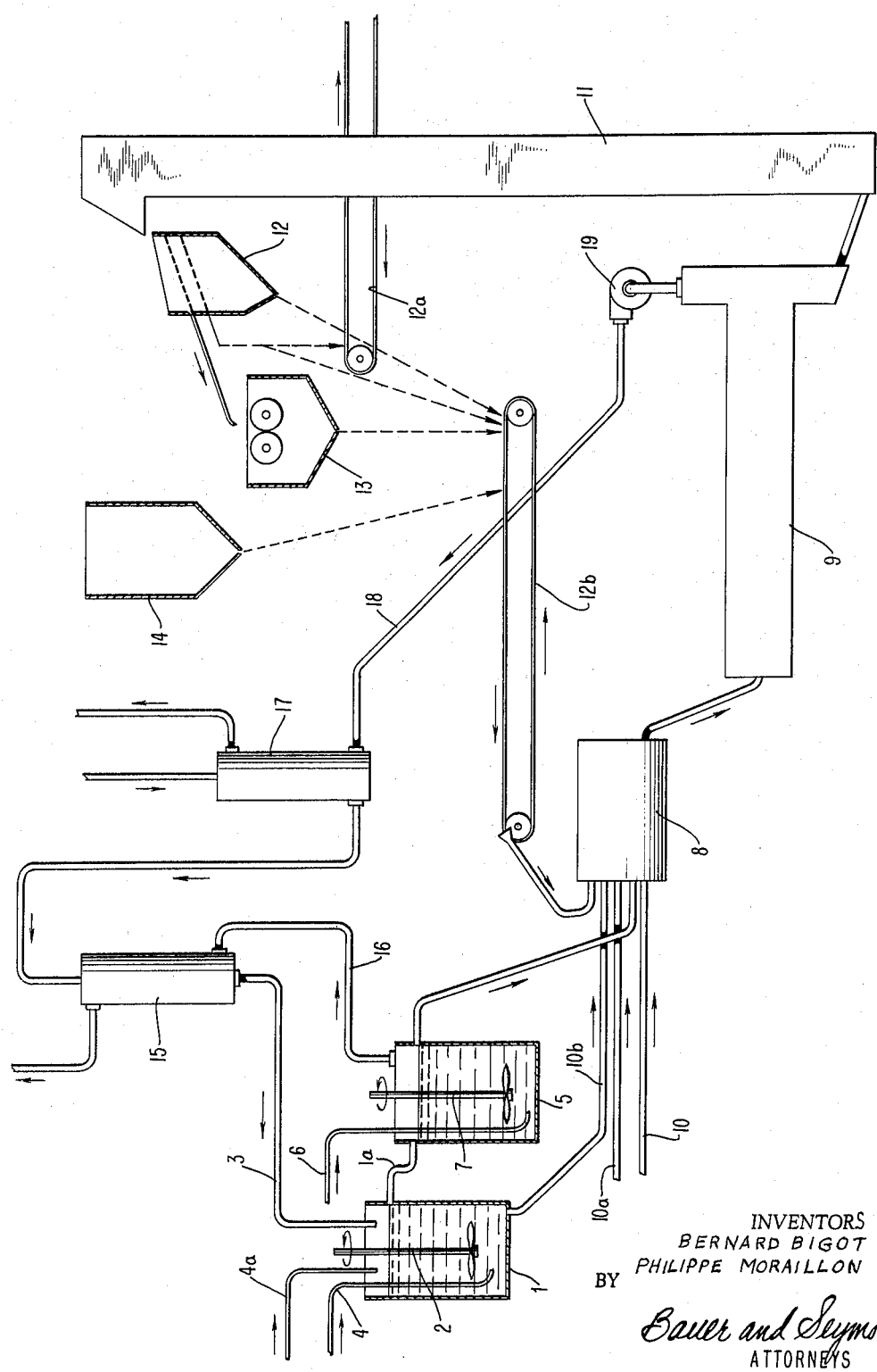
INVENTORS
BERNARD BIGOT
PHILIPPE MORAILLON
BY
*Bauer and Seymour*
ATTORNEYS

United States Patent Office 3,249,421
Patented May 3, 1966

3,249,421
PROCESS FOR MANUFACTURING COMPLEX GRANULATED FERTILIZERS
Bernard Bigot, Rouen, and Philippe Moraillon, Bois-Guillaume, France, assignors to Produits Chimiques Pechiney-Saint-Gobain, Neuilly-sur-Seine, France
Filed Feb. 12, 1963, Ser. No. 257,940
Claims priority, application France, Feb. 15, 1962, 888,090
8 Claims. (Cl. 71—41)

This invention relates to the manufacture of complex granulated fertilizers containing phosphatic and ammoniacal constituents, a high proportion of mono- and diammonium phosphates, and when desired, other fertilizing constituents. In making the fertilizers the constituents used as raw materials in the process are acids of fertilizer grade, phosphates of fertilizer grade and salts possessed of fertilizing powers. Exemplary of the acid of fertilizer grade are phosphoric acid, sulphuric acid, and nitric acid. Exemplary of the phosphates of fertilizer grade are natural phosphates, such as Moroccan and Florida phosphates, and certain high phosphate slags. Exemplary of the useful salts are salts of potassium and trace elements, for instance as their chlorides.

The manufacture of complex fertilizers containing mono- and diammonium phosphate is currently carried out by neutralizing phosphoric acid, alone or mixed with other acids by means of ammonia. One known process arranges three vats in series and neutralizes the phosphoric acid with the ammonia so as to produce in the first vat a ratio of $NH_3$ to $PO_4$ between .85 and 1, and a temperature of 100–110° C. In the second vat this ratio may be brought to a maximum of 1.83 and a temperature below 110° C. While in the third vat the temperature is reduced to less than 85° C., and homogenization takes place. Thereafter, the sludge is granulated. That process includes the difficulty of regulating the water content, the fluidity, the absorption of ammonia, and the granulation so as to produce a final satisfactory form and water content. These difficulties arise from the fact that in order to permit agitation, the absorption of ammonia, and granulation, the sludge issuing from the second vat should have a water content between 15 and 20%. The introduction of sulphuric acid to the first vat increases the nitrogen content but the water content rises to 20 to 25%. The introduction of other constituents such as KCl, $NH_4NO_3$ may be accomplished during the recycling of the product through the granulator. In that process the ammoniation taking place only in the vats in the sludge phase, it is necessary to have substantial water content in order to maintain sufficient fluidity. The final state of ammoniation is thus imposed initially for a given formula of fertilizer. The admission of these sludges to the granulator and drier requires recycling of large quantities of the product, usually 8–10 times the weight of new product, if satisfactory granulation is to be achieved. Altogether that process requires apparatus of large size, it uses a large number of calories, and the loss of ammonia during drying is substantial, which reduces the value of the $NH_3/PO_4$ ratio.

It is an object of the invention to improve that process, to make it controllable, to reduce the size of the apparatus in which it is carried out, to reduce recycling, to reduce the loss of ammonia, to produce fertilizers by that process which have a better ratio of $NH_3$ to $PO_4$, and to produce complex fertilizers having high contents of monoammonium phosphates and diammonium phosphates.

The objects of the invention are accomplished, generally speaking, by a method of making complex granular fertilizers which comprises mixing at the boil in the first reaction mass phosphoric acid and ammonia in proportions producing a ratio of $NH_3/PO_4$ between about .70 and about .85, transferring the product of reaction as formed to a second reaction mass and adding ammonia in an amount producing a ratio of $NH_3/PO_4$ between about 1.35 and about 1.6, adding the product of the second reaction mass as formed to a mass undergoing granulation and agitation, adding enough ammonia thereto to produce a higher content of diammonium phosphate, recycling final, dry fertilizer grains thereto, and drying the product.

The process, being somewhat complex, can best be understood by referring the examples to the accompanying drawing, which is a diagram and flow sheet. The generalities of the process will be explained after some familiarity has been attained through the examples.

The apparatus schematically illustrated in the drawing is designed to produce granulated fertilizers continuously, in substantial quantities, which contain a large content of diammonium phosphate.

A cylindrical reaction vessel is provided with an agitator 2, receives phosphoric acid through conduit 3, and ammonia through conduit 4. If some other acid of fertilizer grade is to be employed simultaneously, it is admitted through conduit 4a. In this first reaction vessel or vat the ratio of $NH_3$ to $H_3PO_4$ is maintained between .7 and .85. As the reaction product forms in this vat, is rises to the surface and travels by overflow 1a to a vat 5 which receives the sludge to which ammonia is added through conduit 6, raising the ratio of $NH_3$ to $H_3PO_4$ to the range between 1.35 and 1.6. This vat is also kept in constant agitation by stirrer 7. The product of ammoniation in vat 5 is transferred by overflow to the granulator 8, usually a rotary drum, into which finely divided seeding materials, the final product of the process, are introduced from conveyor 12b and additional ammonia, usually liquid, is added through conduit 10. The addition of the ammonia permits the increase of the nitrogen content of the final product to the level desired in the final granulated fertilizer product, which may approach 2. From the granulator 8 the granules flow to the drier 9 through which hot dry gas flows. The dried product from the drier passes through the elevator 11 to a screen 12 from the upper layer of which particles too coarse for commercial use are directed to a crusher 13, the particles being dropped on conveyor 12b. From the second level of the screen is taken the medium size particles which are satisfactory for sale, and a substantial part of these is directed to the conveyor 12a, which transports them to storage. The remainder, if desired, is directed to the conveyor 12b and recycled through the granulator. The fine particles which are too fine for satisfactory commercial use flow to the conveyor 12b and are recycled through the granulator.

The ammoniacal gases which arise through the drier 9 flow through a blower 19 and conduit 18 to a pair of scrubbers 17, 15 where they engage the incoming phosphoric acid which is to be used in the first vat. The gases flowing out of the second vat 5, flow through conduit 16 to the second scrubber 15 in which they are engaged by ammoniated phosphoric acid from scrubber 17. The gases from the scrubbers are discharged or treated as desired.

The following examples illustrate various phases of the invention.

*Example 1*

The vat 1 receives a continuous flow of 10.7 metric tons per hour of phosphoric acid containing 45% $P_2O_5$, which had been prepared in the wet way from Moroccan phosphate. At the same time there is continuously introduced the amount of ammonia necessary to keep the ratio of $NH_3$ to $PO_4$ at .8, which required 950 kgs. of ammonia per hour. The reaction mass was maintained, largely by the heat of reaction, at boiling and contained between 15 and 16% of water. As the product formed, it flowed by overflow into a second vat in which 825 kgs. of ammonia per hour were added in order to increase the ratio of $NH_3$ to $PO_4$ to 1.5. The temperature was about 110° C. and the product contained 10.5% of water. As it was formed the product flowed into the granulator, a rotary tube, where it received the recycled final product of the process at the rate of not more than 5 times its own weight. Into this granulator there was flowed 410 kgs. per hour of ammonia, which raised the $NH_3$ to $PO_4$ ratio to 1.85.

The product of the granulator fell into the drier and was treated with hot gas (air) at 80 to 85° C. at the discharge end of the tube. The product was screened at the rate of 10 tons per hour of completed fertilizer having the composition 18.48.0, which means, on the NPK system, 18% total N, 48% $P_2O_5$ and 0% $K_2O$, and which contained less than 1% water.

*Example 2*

Using the apparatus of Example 1, the first saturator received simultaneously and continuously 10 tons per hour of phosphoric acid (30% $P_2O_5$) derived in the wet way from Florida phosphate, 7.2 tons per hour of sulphuric acid (92%) and 2.85 tons per hour of ammonia. These proportions produced a ratio of ammonia to $PO_4$ of .78, while the water content was less than 20%. The sludge flowed to a second saturator into which were continuously introduced 530 kgs. of ammonia per hour, which raised the ratio of ammonia to $PO_4$ to 1.48, while the water content was reduced to 16%. The overflow passed to the granulator where it was mixed with recycled fertilizer from the drier, raising the ratio of $NH_3$ to $PO_4$ to 1.85 by the addition of 270 kgs. of ammonia per hour. The product went to a drier and was dried below 85° C. The granulated product was discharged at a rate of 15 tons per hour. It analyzed 20.20.0, and had a water content less than 1%.

*Example 3*

Under the conditions aforesaid there was continuously introduced with the product of the second vat into the granulator 5 tons per hour of potassium chloride containing the equivalent of 60% $K_2O$. This was achieved by adding KCl from a storage bin 14 to the recycled product on the belt conveyor 12b of the drawing. The product was discharged at a rate of 20 tons per hour and analyzed at 15.15.15. (15% total N, 15% $P_2O_5$, 15% $K_2O$.)

*Example 4*

Phosphoric acid titrating 30% $P_2O_5$ was introduced continuously into the first vat at a rate of 11.2 metric tons per hour, while 9 tons of 92% $SO_4H_2$ and 3.5 tons of ammonia, per hour, were simultaneously added. The sludge had a ratio of $NH_3$ to $PO_4$ of .75 and a water content of about 18%. The reaction product flowed as it formed by overflow into a second reactor where it was treated with 580 kgs. per hour of ammonia, which raised the $NH_3:PO_4$ ratio to the vicinity of 1.45 and reduced the water content to 15%. The overflow from the second tank was mixed with recycled product in the granulator wherein it was also mixed with 500 kgs. per hour of sulphuric acid, which lowered the $NH_3:PO_4$ ratio below 1.25, while the water content was reduced another 2% by the acid and heat of reaction. At the same time, in the granulator 5.6 tons per hour of potassium chloride, equivalent to 60% $K_2O$, were added with the recycled product. The granulated product was dried at about 90° C. A final product analyzed 14.14.14 and had a water content less than 1%. The rate of manufacture was 24 tons per hour.

*Example 5*

9 tons per hour of phosphoric acid containing 40% $P_2O_5$ which had been produced by the wet way from apatite were introduced continuously into a first saturator jointly with 730 kgs. per hour of ammonia. The product as formed had a ratio of ammonia to $PO_4$ of about .82 which flowed by overflow into a second saturator which received simultaneously 7.15 tons per hour of ammonium nitrate liquor, containing 90% $NO_3NH_4$, and 640 kgs. per hour of ammonia. The sludge in the second saturator had a ratio of $NH_3$ to $PO_4$ of 1.55 and a water content of 8%. It entered the granulator with the recycled product enriched by 6 tons per hour of potassium chloride having a $K_2O$ equivalent of 60%, and also received 270 kgs. per hour of ammonia, which raised the ratio of $NH_3$ to $PO_4$ to about 1.85.

The product was dried at a temperature of 80–85° C., and the product which was put on sale was subjected to a supplementary drying to reduce its water content to less than .5%. 20 tons per hour were produced having a composition 18.18.18.

Examples 6, 7 and 8 deal particularly with that phase of the process in which the reaction mass is reacidified in the granulator.

*Example 6*

Into the first reaction vat there was introduced 11.2 tons per hour of phosphoric acid containing 45% $P_2O_5$ simultaneously with 930 kgs. per hour of ammonia, which produced 70% of the theoretical amount of monoammonium phosphate. The product as formed contained 15% of water and 55% of it flowed directly to the granulator, by-passing the second vat. The other 45% entered the second reaction vat in which the level of saturation reached 1.4 by the introduction of 390 kgs. per hour of ammonia, the water content being reduced to 10%. The overflow from the second vat entered the granulator with the 55% coming from the first vat and both were spread on a bed of recycled, dried product. 8.4 tons per hour of potassium chloride (60% $K_2O$) were also admitted to the granulator. 18 tons per hour of product issued from the drier with a content of 6.28.28.

*Example 7*

Into the first reaction vat were simultaneously poured 12.5 tons per hour of phosphoric acid (32% $P_2O_5$) 4.1 tons per hour of 92% $SO_4H_2$, and 2.1 tons per hour of ammonia. The water content was about 17%, and the ratio of neutralization .75. Half of this was sent directly to the granulator by conduit 10b, and the other half poured into the second reaction vat where there was simultaneously introduced 340 kgs. per hour of ammonia. The ratio of neutralization became 1.45, and the water content fell below 15%. The overflow from the second reaction vat entered the granulator with 260 kgs. per hour of 92% sulphuric acid which was admitted through conduit 10a. The granulator contained a bed of recycled product to which had been added 6.7 tons per hour of potassium chloride containing 60% $K_2O$. The final product issuing from the drier was 20 tons per hour of fertilizer analyzed at 10.20.20.

*Example 8*

The phosphoric acid obtained by a wet method reaction on Florida phosphate (30% $P_2O_5$) was introduced continuously into the first saturator at a rate of 11.2 tons per hour and, simultaneously there were introduced 9 tons per hour of sulphuric acid (92% $SO_4H_2$), and 3.5 tons per hour of ammonia. The saturation ratio of $NH_3$ to $PO_4$ was .75, and the water content was 18%. The overflow from the first vat went into the second where it was treated with 580 kgs. per hour of ammonia which raised the neutralization rate to 1.45, and reduced the water content below 15%. This was mixed with the recycled product and the whole received 500 kgs. per hour of sulphuric acid (92%), which lowered the ratio of $NH_3$ to $PO_4$ below 1.25, while the water content dropped another 2%. 5.6 tons per hour of potassium chloride (60% $K_2O$), being mixed with the recycled product before admission to the granulator. The product was dried at 90° C., had less than 1% water content and a composition of 14.14.14. The rate of production was 24 tons per hour.

In each of these examples the amount of finely divided final product which was returned to the granulator varied widely, being largely controlled by the amount which was sent to storage. In general the amount of the final product recycled ranged from a minimum recycling of 100% to a maximum recycling of 5 times the weight of the reaction mass issuing from the second reaction vat.

In the reacidification in the granulator there has been used the acid product issuing from the first reaction vat, and the acids of fertilizer grade especially sulphuric acid, nitric acid, phosphoric acid, and superphosphoric acid. There have also been used mixtures of such acids.

The present invention has accomplished the restriction of the ammoniation of the sludges in the reaction vats to values corresponding to the maximum fluidity of the sludges. The completion of the ammoniation or, on the other hand, a reacidification of the neutralized mass is achieved in the granulator at the moment of granulation. The invention is based on relationships which we have ascertained relating to the differences of solubility of the phosphates of ammonia according to their degrees of neutralization. The ratio of neutralization is defined as the molar ratio of ammonia which has been combined with phosphoric acid to the total phosphoric acid. Otherwise stated it is the ratio of the ammonia in the ammonium phosphate to the total phorphoric acid that has been added to the reaction. The practically total solubility of ammonia in phosphoric acid decreases progressively until the ratio of 1.04 is reached, increasing thereafter to a new maximum for a ratio of 1.5 which corresponds to approximately equivalent proportions of mono- and diammonium phosphate, thereafter decreasing again until, at a ratio of 2 it is almost all biammonium phosphate. When one considers not only the liquids but the sludges containing crystallized salts in suspension and precipitated impurities, one achieves approximately the same zones of maximum and minimum fluidity or, which amounts to the same thing, water contents more or less high for a given fluidity. This effect continues with limited departures from the critical ratios in the presence of even substantial quantities of ammonium sulphate, ammonium nitrate, ammonium chloride, and other salts of fertilizer grade. We have determined the variations in water content for sludges of constant fluidity for the principle equilibriums and for each desired fertilizer formula during the coarse of the neutralization. For example in the case of phosphoric acid which has been obtained by wet reaction from Moroccan phosphate of 75% $P_2O_5$, the water contents for the maintenance of uniform fluidity in the sludge, the fluidity being selected to permit the absorption of ammonia in the reaction vats and in the granulator, are as follows:

Ratio:
$NH_3/PO_4$: 0.75 —————————— $H_2O\%$: 14.00
$NH_3/PO_4$: 0.85 —————————— $H_2O\%$: 18.10
$NH_3/PO_4$: 1.00 —————————— $H_2O\%$: 22.20
$NH_3/PO_4$: 1.25 —————————— $H_2O\%$: 15.50
$NH_3/PO_4$: 1.50 —————————— $H_2O\%$: 10.20
$NH_3/PO_4$: 1.85 —————————— $H_2O\%$: 20.80

On this basis the neutralization in fluid state takes place in two steps: in the first step the process is carried out in acid medium at the boil in the presence of large quantities of ammonia. The water content should be such in this step that a minimum water content will be required in the last stage, taking into consideration the modification of water content arising from the evaporation of water and the fixation of anhydrous ammonia. The ratio of neutralization in the first stage is chosen to maintain a fluidity favorable to saturation by $NH_3$. This ratio is preferably about .8 but it may vary between .7 and .85 according to the type of process.

The second stage of neutralization is situated normally in the zone of maximum fluidity of mixtures of mono- and diammonium phosphates. This ratio is preferably at about 1.5 but may vary between 1.35 and 1.6 according to the type of process. It is preferred that this stage of the process be carried out below boiling.

It is apparent that these ratios once determined for a given formula and for selected raw materials need not be changed during manufacture.

The sludge issuing from the second stage of neutralization is mixed with the product recycled through the granulator and may there undergo the completion of its ammoniation or it may be reacidified. The additional ammoniation in the granulator requires a proportion of the total ammonia so low that one may, if one wishes, produce even more than 90% of diammonium phosphate in the product without using an apparatus of large volume, like that of the prior art, and without loss of the large quantities of ammonia that occurred in the prior art.

The calories resulting from the ammoniation and some reacidification in the granulator assist in removing water and this reduces the quantity of recycling of final product to the granulator which was required in the prior art process.

This process permits the direct production of many different fertilizers, as illustrated by the examples, both by the manipulation of the basic ammoniation process, as aforesaid, and by the addition of other raw materials. Sulphuric and nitric acids may be mixed with the phosphoric acid in proportions which establish in advance selected contents of nitrogen and $P_2O_5$. It is also possible to introduce salts of fertilizer quality such as ammonium nitrate and various nitro-ammonia liquors in place of the corresponding acids, these additions being made either in the sludge during neutralization or during granulation.

Generally speaking, the more soluble salts are introduced into the sludges where they contribute to improve the fluidity and, at the same time, reduce the proportion of water, while the less soluble salts are added to the masses which are being returned from granulation.

Salts which may be added to the mass are, among others, the chlorides and sulphates of potassium and ammonium, superphosphate, and other phosphates, magnesium salts, ballast such as sand, clay, gypsum, and anti-agglomerants.

The following table gives the maximum compositions of fertilizers which can be produced from wet method phosphoric acid. The intermediate values and minor variations, as well as lower values, may be obtained by combinations of fertilizers of these formulas with others or by the addition of ballast.

|  |  | With KCl |
|---|---|---|
| Mono-ammonium phosphate | 12-54-0 | 6-28-28 |
| With ammonium sulphate | 18-18-0 | 13.8-13.8-13.8 |
| With ammonium nitrate | 24.5-24.5-0 | 17.3-17.3-17.3 |
| With urea | 28.2-28.2-0 | 19-19-19 |
| Diammonium phosphate (80-90%): |  |  |
| By itself | 18.5-48.5-0 | 10-26.84-26.8 |
| With ammonium sulphate | 20-20-0 | 15-15-15 |
| With amonium nitrate | 26-26-0 | 18-18-18 |
| With urea | 29.5-29.5-0 | 20-20-20 |

In the ammoniation of the phosphoric acid the invention regulates the ammoniation in the vats at values which correspond to the maximum fluidity of the sludges and completes the ammoniation in the pasty state during granulation. It should be understood that the granulation takes place upon pasty masses which have lost much of their fluidity. This technique is based upon differences in solubility of ammonium phosphates according to their degree of neutralization.

When reacidification takes place in the granulator the reacidification may employ any other acid which participates in the reaction, or mixtures of them, or the acid product of the first reaction mass, or a mixture of that first product with an acid, for example, one may introduce into the granulator by conduit 10 of the drawing some ammonia, by conduit 10a some acid, and by conduit 10b some of the mixture issuing from the first vat. This permits the introduction of such quantities as will establish the content of nitrogen or of acid at the value desired, according to the type of fertilizer being made.

Among the advantages of the invention are these that the apparatus previously employed in the prior art is substantially reduced in size, that the product produced is more uniform, and that the quantity of heat employed is less because of the greater efficiency achieved in carrying out the ammoniation on sludges at their concentrations of maximum fluidity. Other advantages will be apparent to persons skilled in the art.

As many apparently widely different embodiments of the present invention may be made without departing from the spirit and scope thereof, it is to be understood that the invention is not limited to the specific embodiments.

What is claimed is:

1. A method of making complex, granulated fertilizers which comprises mixing with agitation at the boil in a first reaction vessel about 10.7 parts per hour by weight of phosphoric acid containing about 45% $P_2O_5$, and about .95 part per hour of ammonia, thereby establishing a ratio $NH_3/PO_4$ which is about .8, transferring product of the reaction, containing water approaching 16%, as it is formed to a second reaction vessel and adding ammonia thereto at a rate of about .825 part per hour, thereby establishing a ratio of $NH_3/PO_4$ of about 1.5 and a water content of about 10.5%, transferring product out of the second reaction vessel as it is formed, agitating and granulating and mixing it with finely divided, dry final product and adding thereto about .41 part weight of ammonia until the ratio of $NH_3/PO_4$=about 1.85, and drying the product to less than 1% $H_2O$.

2. A method of making complex granulated fertilizers which comprises mixing in a first reaction vessel, with agitation at the boil, 10 parts per hour by weight of phosphoric acid containing about 30% $P_2O_5$, about 7.2 parts per hour of $H_2SO_4$ of 92% concentration, and about 2.85 parts per hour of ammonia, thereby establishing a ratio $NH_3/PO_4$ which is about .78 and a water content less than 20%, flowing the product of reaction as it forms to a second reaction vessel and adding thereto about .53 part per hour of ammonia, thereby raising the ratio $NH_3/PO_4$ to about 1.48 and reducing the water content to about 16%, transferring the product out of the second reaction vessel, agitating and granulating and adding thereto about .27 part per hour of ammonia, thereby raising the ratio $NH_3/PO_4$ to about 1.85 and drying the product to a water content less than 1%.

3. A method of making complex granulated fertilizers which comprises, in addition to the steps recited in claim 2, recycling finely divided final product to the granulation mass and mixing therewith about 5 parts per hour of KCl having a $K_2O$ equivalent of 60%.

4. A method of making complex granular fertilizers which comprises adding to a boiling first reaction mass in a first reaction vessel per hour about 11.2 parts by weight of phosphoric acid of about 30% $P_2O_5$, about 9 parts by weight of 92% $H_2SO_4$, and about 3.5 parts by weight of ammonia, thereby establishing a water content of about 18% and a ratio $NH_3/PO_4$ about .75, transferring the reaction products as formed to a second reaction vessel and adding thereto about .58 part per hour ammonia and establishing a water content about 15% and a ratio $NH_3/PO_4$ about 1.45, removing the product, granulating and agitating and mixing therewith .5 part per hour 92% $H_2SO_4$, and mixing it with about finely divided final product and KCl, thereby reducing the water content and establishing the ratio $NH_3/PO_4$ at not over 1.25, and drying the product to less than 1% $H_2O$.

5. A method of making complex granular fertilizers which comprises mixing in a first reaction vessel acid of fertilizer grade comprising phosphoric acid at the boil with ammonia in proportions producing a ratio of $NH_3/PO_4$ between about .70 and about .85 and a water content below about 20%, transferring the product of reaction to a second reaction vessel and mixing ammonia therewith in an amount producing a water content between about 8 and about 16% and a ratio of $NH_3/PO_4$ between about 1.35 and about 1.6, removing the product from the second reaction vessel and mixing it in a granulator with finely divided final product, agitating, granulating and adding ammonia thereto in amount sufficient to produce a higher content of diammonium phosphate and a ratio of $NH_3/PO_4$ between about 1.85 and about 2.0, and drying the product.

6. A method according to claim 5 in which KCl is mixed in the granulator with the product from the second reaction vessel.

7. A method of making complex granular fertilizers which comprises mixing in a first reaction vessel acid of fertilizer grade comprising phosphoric acid at the boil with ammonia in proportions producing a ratio of $NH_3/PO_4$ between about .70 and about .85 and a water content below about 20%, transferring the product of reaction to a second reaction vessel and mixing ammonia therewith in an amount producing a water content between about 8 and about 16% and a ratio of $NH_3/PO_4$ between about 1.35 and about 1.6, removing the product from the second reaction vessel and mixing it in a granulator with finely divided final product, and with acidic material of fertilizer grade from the class consisting of acids and products of reaction from the first reaction vessel, agitating and granulating the mixture, and drying the product.

8. A method according to claim 7 in which KCl is mixed with the reaction mass in the granulator.

References Cited by the Examiner

UNITED STATES PATENTS

| | | | |
|---|---|---|---|
| 1,999,026 | 4/1935 | Tramm et al. | 71—37 |
| 2,726,949 | 12/1955 | Andres et al. | 71—43 |
| 2,792,286 | 5/1957 | Wordie et al. | 71—41 |
| 2,891,856 | 6/1959 | Getsinger et al. | 71—43 |
| 2,978,313 | 4/1961 | Moyrand et al. | 71—37 |
| 3,011,875 | 12/1961 | Sumner | 71—43 |
| 3,019,099 | 1/1962 | Walters | 71—43 |

DONALL H. SYLVESTER, *Primary Examiner.*

ANTHONY SCIAMANNA, *Examiner.*

H. R. CAINE, *Assistant Examiner.*